United States Patent
Lee et al.

(10) Patent No.: US 7,826,234 B2
(45) Date of Patent: Nov. 2, 2010

(54) ELECTRONIC DEVICE AND POSITIONING STRUCTURE THEREOF

(75) Inventors: Chien-Kuo Lee, Taipei County (TW); Po-Feng Chuang, Taoyuan County (TW); Cheng-Feng Tsai, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 344 days.

(21) Appl. No.: 12/189,324

(22) Filed: Aug. 11, 2008

(65) Prior Publication Data

US 2009/0290297 A1 Nov. 26, 2009

(30) Foreign Application Priority Data

May 20, 2008 (TW) .............................. 97208736 U

(51) Int. Cl.
*H05K 7/14* (2006.01)
(52) U.S. Cl. ...................... 361/809; 361/807; 361/808; 361/679.23
(58) Field of Classification Search ............ 361/679.23, 361/807, 808, 809; 174/520
See application file for complete search history.

(56) References Cited

U.S. PATENT DOCUMENTS 6,873,356 B1 * 3/2005 Kanbe et al. ............. 348/207.1
2001/0014006 A1 * 8/2001 Kim et al. .................. 361/683
2002/0126443 A1 * 9/2002 Zodnik ..................... 361/683
2003/0112591 A1 * 6/2003 Zodnik ..................... 361/683
2005/0201047 A1 * 9/2005 Krah ........................ 361/683

* cited by examiner

*Primary Examiner*—Dameon E Levi
(74) *Attorney, Agent, or Firm*—Thomas, Kayden, Horstemeyer & Risley

(57) ABSTRACT

An electronic device includes a base, an intermediate member and a lens. The base includes a guiding portion, and a first, second and third connecting portions. The intermediate member includes a first, second and third engaging portions connected to the first, second and third connecting portions, respectively. The lens is disposed at a predetermined position via the intermediate member. When the first engaging portion situated in a first position is connected to the first connecting portion, the intermediate member has at least two degrees of freedom. When the intermediate member is positioned at a second position from the first position by the guide of the guiding portion, the second and third engaging portions are connected to the second and third connecting portions, wherein the intermediate member has zero degree of freedom, and the lens is disposed at the predetermined position via the intermediate member.

20 Claims, 9 Drawing Sheets

ELECTRONIC DEVICE AND POSITIONING STRUCTURE THEREOF

CROSS REFERENCE TO RELATED APPLICATIONS

This Application claims priority of Taiwan Patent Application No. 097208736, filed on May 20, 2008, the entirety of which is incorporated by reference herein.

BACKGROUND OF THE INVENTION

1. Field of the Invention

The present invention relates to a positioning structure, and in particular relates to an electronic device and a positioning structure thereof capable of positioning and engaging via rotation.

2. Description of the Related Art

With respect to an electronic device (e.g. a laptop) provided with a lens, a circuit board for the lens is provided with several electronic components thereon. When the lens and the circuit board thereof are positioned on the electronic device, the electronic components of the circuit board of the lens are generally interfered with by the structure of the electronic device.

BRIEF SUMMARY OF THE INVENTION

In view of the inconvenience mentioned above, a positioning structure is provided to avoid interference during the installation of the lens. The positioning structure comprises a first body and a second body. The first body comprises a guiding portion, a first connecting portion, a second connecting portion and a third connecting portion. The second body movably switched from a first position to a second position with respect to the first body comprises a first engaging portion, a second engaging portion and a third engaging portion. The first engaging portion, the second engaging portion and the third engaging portion of the second body are engaged to the first connecting portion, the second connecting portion and the third connecting portion of the first body, respectively. When the first engaging portion of the second body located at the first position is engaged to the first connecting portion of the first body, the second body is provided with at least two degrees of freedom with respect to the first body. When the first engaging portion of the second body, movably switched from the first position toward the second position and guided by the guiding portion of the first body, is positioned at the second position, the second connecting portion and the third connecting portion of the first body are positioned at the second engaging portion and the third engaging portion of the second body, respectively, and the second body is provided with zero degree of freedom with respect to the first body.

Further, an electronic device is provided. The electronic device comprises a substrate, an intermediate member and a lens. The substrate comprises a guiding portion, a first connecting portion, a second connecting portion and a third connecting portion. The intermediate member movably switched from a first position to a second position with respect to the substrate comprises a first engaging portion, a second engaging portion and a third engaging portion. The first engaging portion, the second engaging portion and the third engaging portion of the intermediate member are engaged to the first connecting portion, the second connecting portion and the third connecting portion of the substrate, respectively. The lens is disposed at a predetermined position via the intermediate member with respect to the substrate. When the first engaging portion of the intermediate member located at the first position is engaged to the first connecting portion of the substrate, the intermediate member is provided with at least two degrees of freedom with respect to the substrate. When the first engaging portion of the intermediate member, movably switched from the first position toward the second position and guided by the guiding portion of the substrate, is positioned at the second position, the second connecting portion and the third connecting portion of the substrate are positioned at the second engaging portion and the third engaging portion of the intermediate member, respectively. The intermediate member is provided with zero degree of freedom with respect to the substrate, and the lens is disposed at the predetermined position via the intermediate member.

Thus, the lens is prevented from interfering with other structures and electronic components located on the substrate by the positioning structure.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
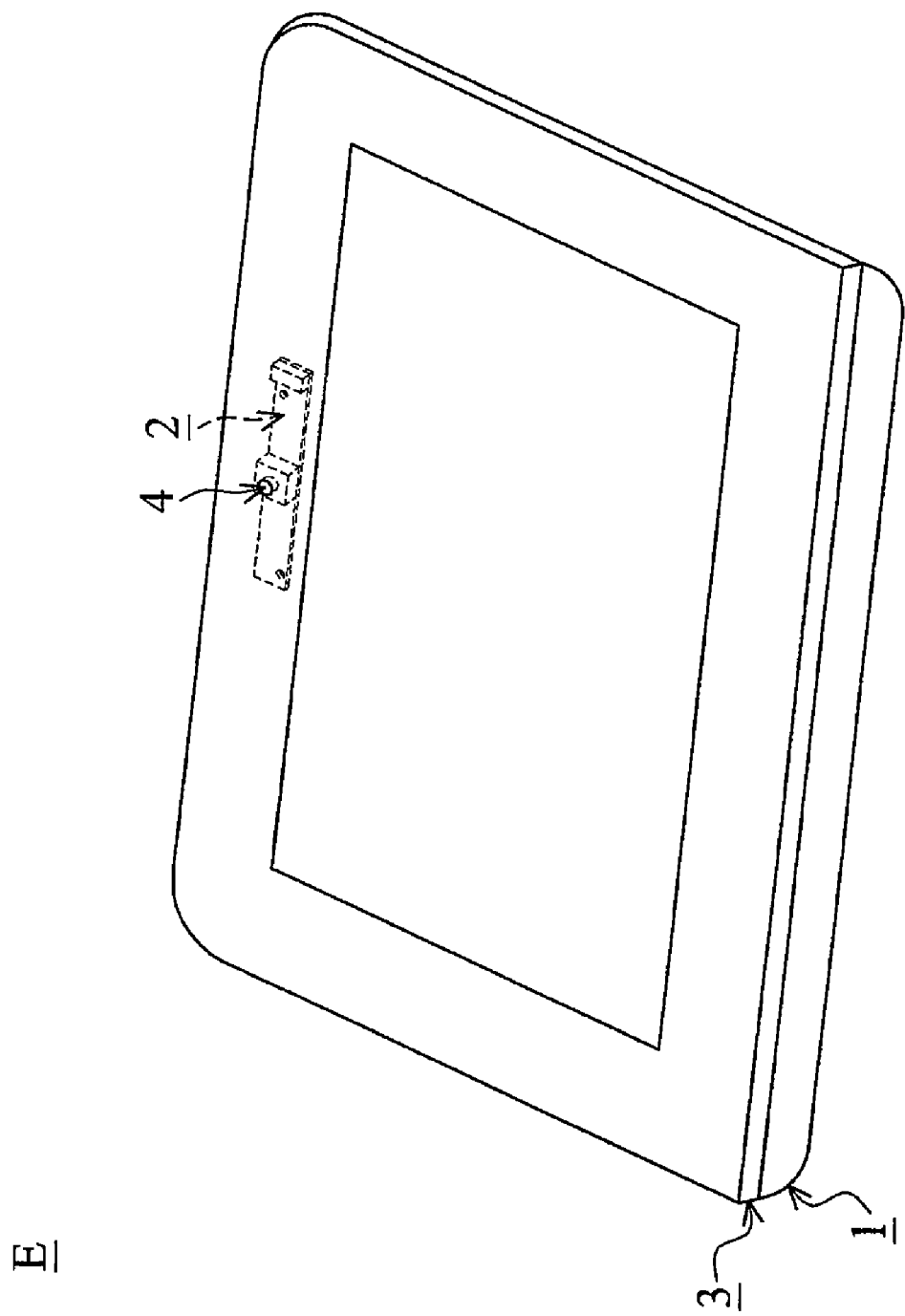
FIG. 1A is an assembled view of an electronic device of the invention.
Figure 1B:
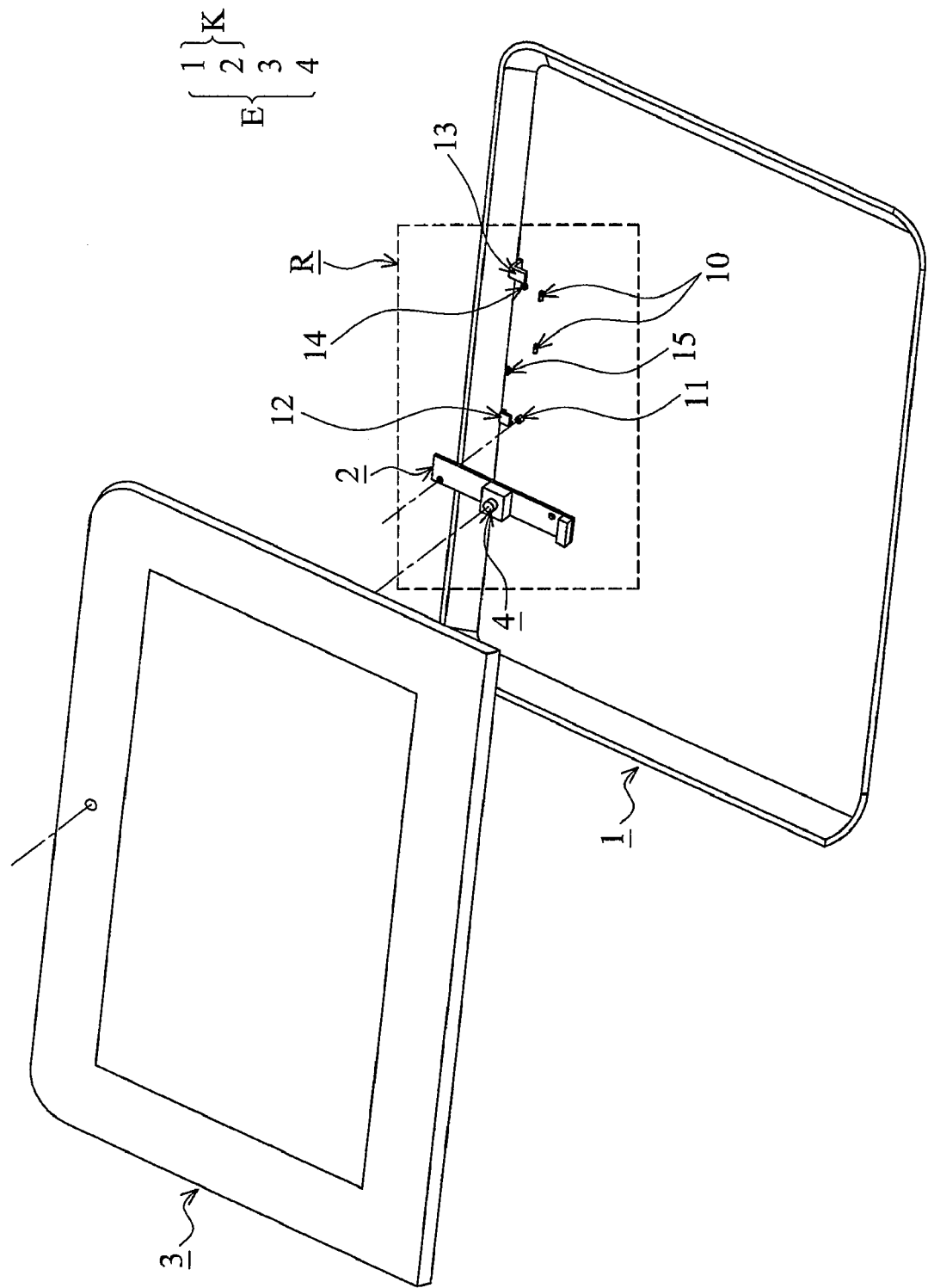
FIG. 1B is an exploded view of the electronic device of the invention.

FIGS. 1A and 1B are assembled and exploded views of an electronic device E of the embodiment.

The electronic device E comprises a positioning structure K, a cover 3 having a side surface, and a lens 4 positioned by the positioning structure K to be outwardly exposed at the side surface of the cover 3. The positioning structure K comprises a first body 1 and a second body 2. In this embodiment, the electronic device E is a display, the first body 1 is a base of the electronic device E, the second body 2 is an intermediate member, and the lens 4 is disposed between the first body 1 and the cover 3, thus, exposing the lens 4 through the cover 3 by the intermediate member. To briefly describe the relationship of the components of the electronic device E, hereinafter, the first body is defined by the substrate 1 and the second body is defined by the intermediate member 2.

Figure 2A:
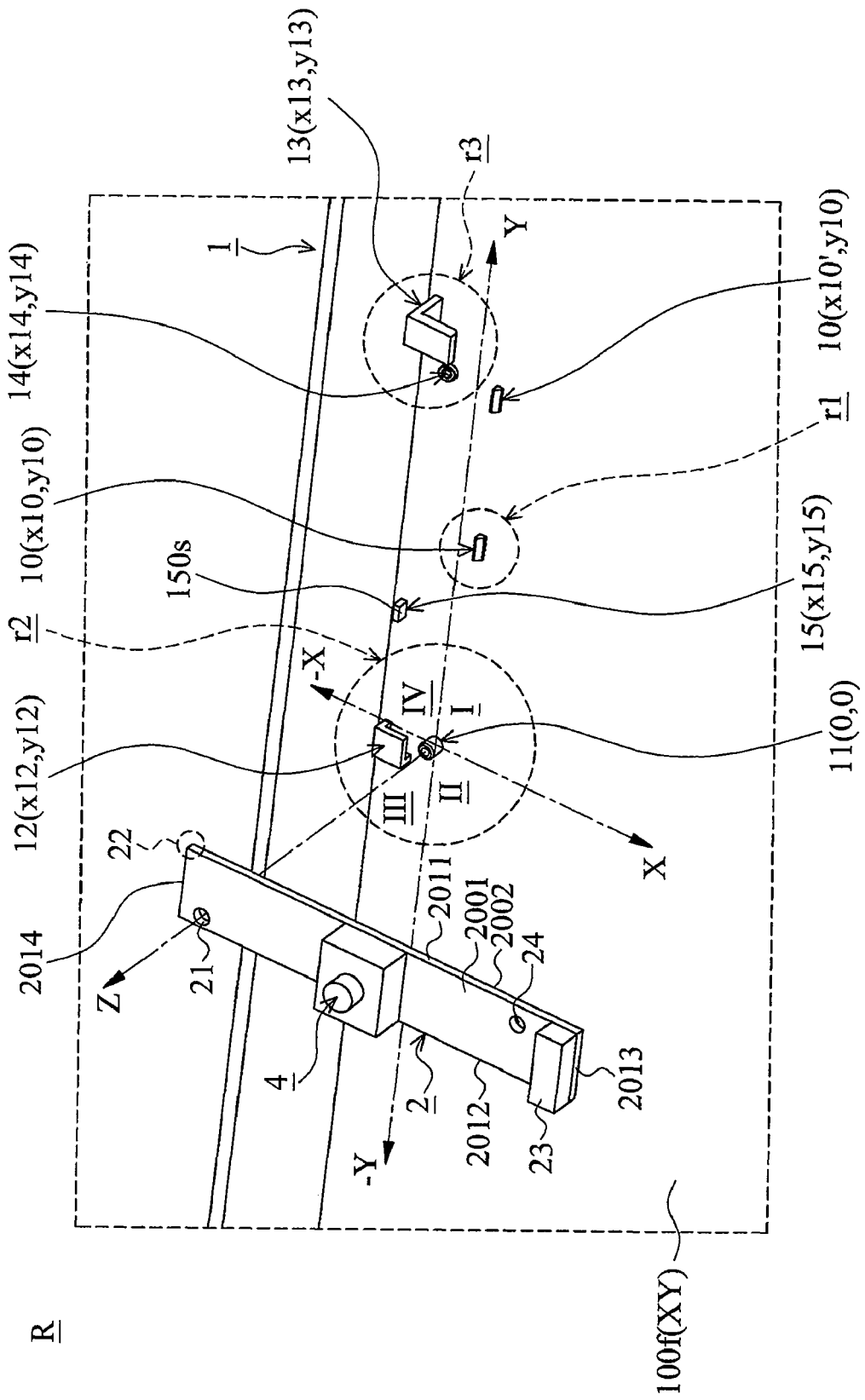
FIG. 2A is an enlarged view of a region (R) in FIG. 1B.
Figure 2B:
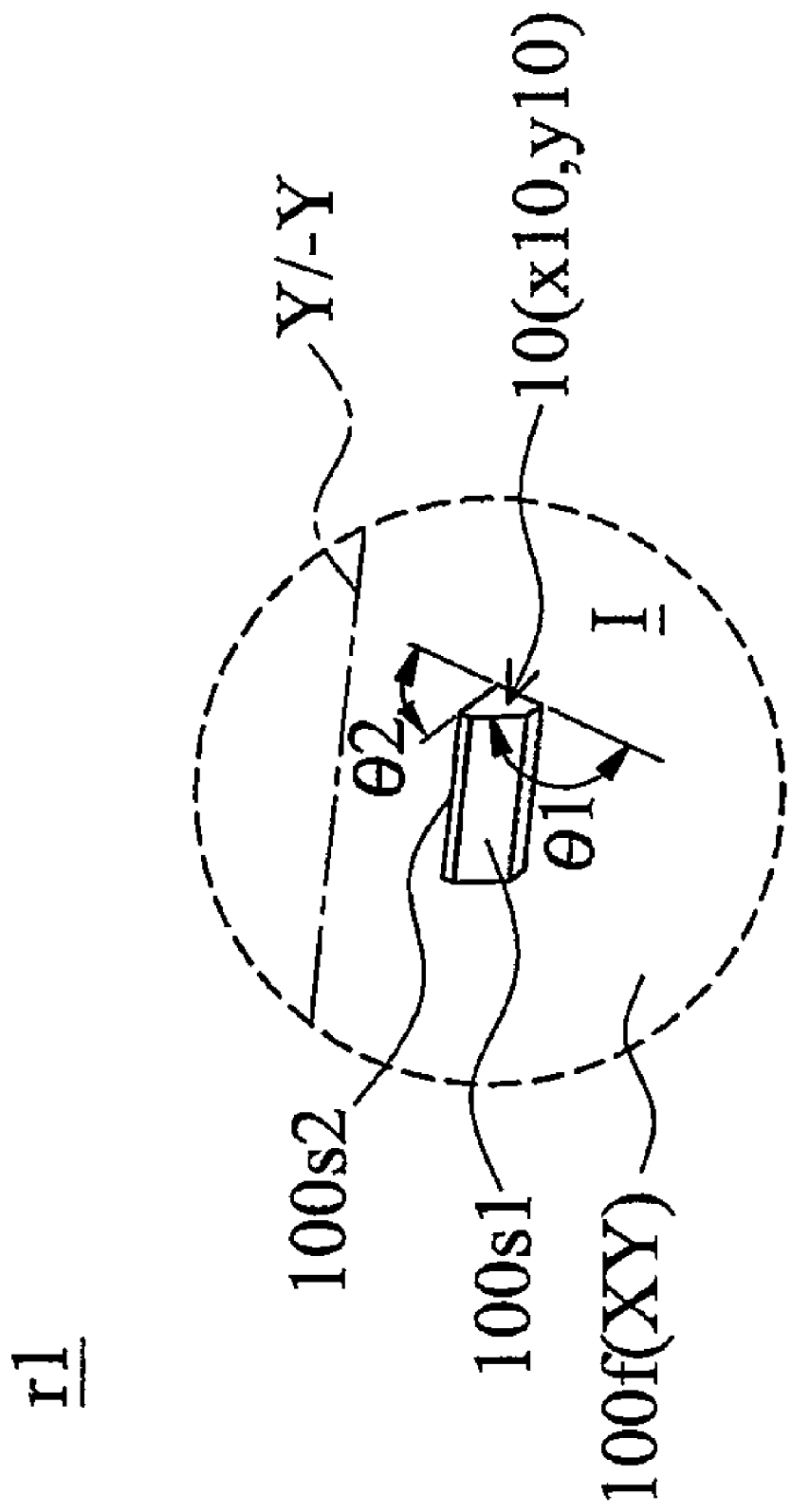
FIG. 2B is an enlarged view of a region (r1) in FIG. 2A.
Figure 2C:
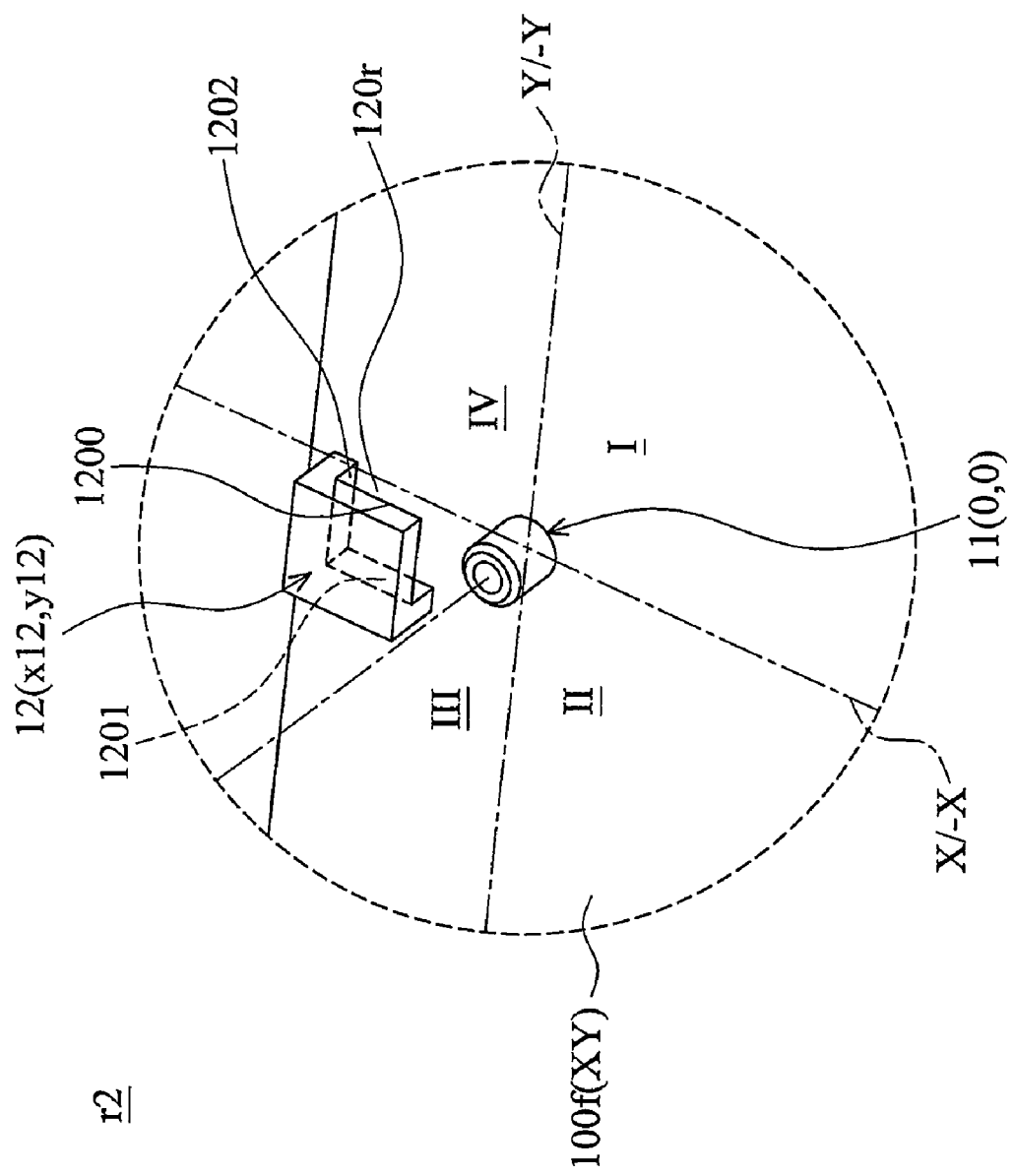
FIG. 2C is an enlarged view of a region (r2) in FIG. 2A.
Figure 2D:
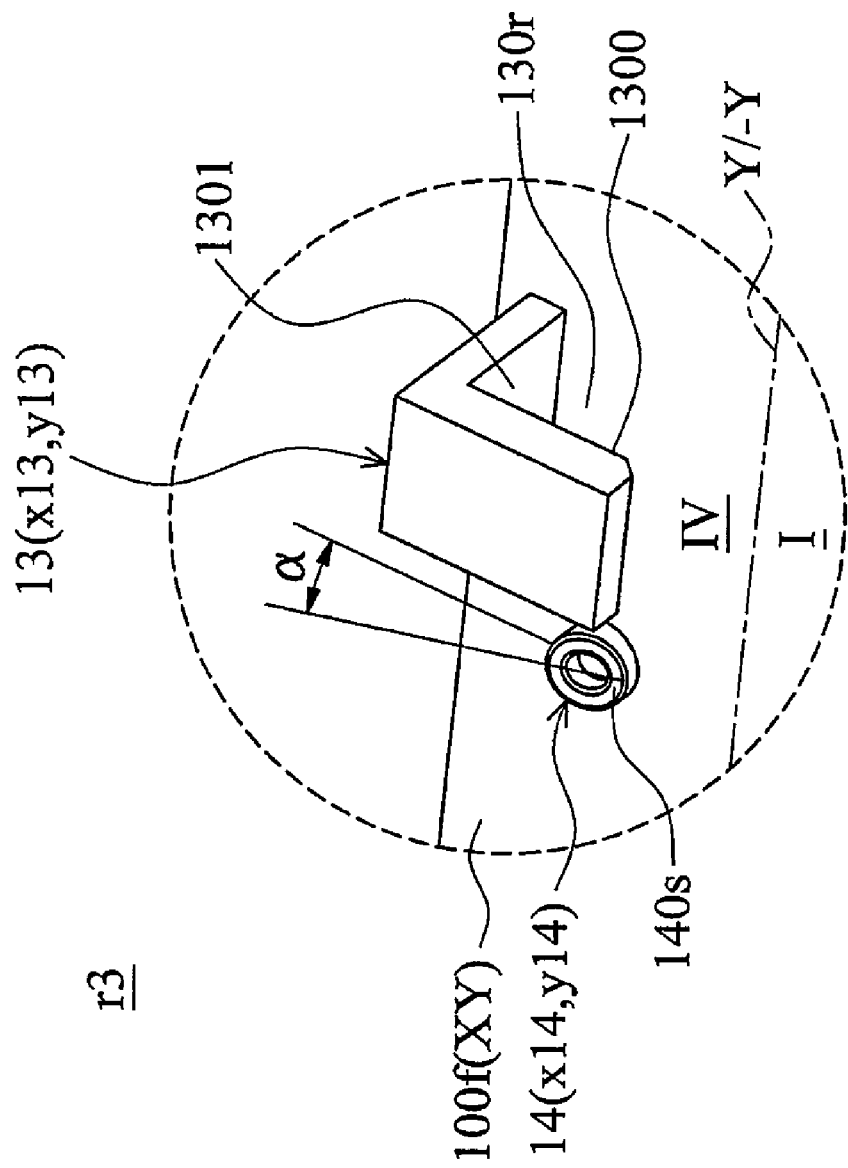
FIG. 2D is an enlarged view of a region (r3) in FIG. 2A.

FIG. 2A is an enlarged view of a region R in FIG. 1B, wherein the intermediate member 2 carrying the lens 4 is separated from the substrate 1. The substrate 1 comprises a base surface 100f, a guiding portion 10, a first connecting portion 11, a second connecting portion 12, a third connecting portion 13, a fourth connecting portion 14 and a fifth connecting portion 15, and the first, second, third, fourth and fifth connecting portions 11, 12, 13, 14 and 15 are formed on the base surface 100f. In this embodiment, the guiding portion 10, and the first, second, third, fourth and fifth connecting portions 11, 12, 13, 14 and 15 are protruded structures which are integrally formed on the base surface 100f and characterized with different functions. For example, the guiding portion 10 in FIG. 2B is formed into a triangular-like structure which includes a slanted surface 100s1 and a thrust surface 100s2, the first connecting portion 11 in FIG. 2C is formed into a cylindrical structure, the second connecting portion 12 in FIG. 2C is formed into a similar L-shaped structure, the third connecting portion 13 in FIG. 2D is formed into a similar L-shaped structure, the fourth connecting portion 14 in FIG. 2D is formed into a cylindrical structure containing a slanted surface 140s, and the fifth connecting portion 15 in FIG. 2A is formed into a post structure containing a thrust surface 150s. In this embodiment, the amount of the guiding portion 10 is two, but it is not limited thereto.

To clearly show the geometrical relationship of the guiding portion 10, the first connecting portion 11, the second connecting portion 12, the third connecting portion 13, the fourth connecting portion 14 and the fifth connecting portion 15 which are located on the base surface 100f, a coordinate system X-Y-Z including three coordinate axes X/−X, Y/−Y and Z/−Z is provided to define the locations of the base surface 100f, the guiding portion 10, and the first, second, third, fourth and fifth connecting portions 11, 12, 13, 14 and 15. The base surface 100f of the first body 1 is defined at a plane XY which is formed by the coordinate axes X/−X and Y/−Y and provided with four quadrants: a first quadrant I, a second quadrant II, a third quadrant III and a fourth quadrant IV. Hereinafter, the base surface 100f is represented by the plane XY, the first connecting portion 11 is defined at an origin (0, 0) intersected by the coordinate axes X/−X and Y/−Y, two guiding portions 10 are respectively defined at two coordinate points (x10, y10) and (x10', y10) of the first quadrant I, the second connecting portion 12 is defined at a coordinate point (x12, y12) of the third quadrant III, the third connecting portion 13 is defined at a coordinate point (x13, y13) of the fourth quadrant IV, the fourth connecting portion 14 is defined at a coordinate point (x14, y14) of the fourth quadrant IV, and the fifth connecting portion 15 is defined at a coordinate point (x15, y15) of the fourth quadrant IV. In this embodiment, the coordinate system X-Y-Z is a rectangular coordinate system, wherein the coordinate axes X/−X and Y/−Y are perpendicular to each other.

Hereinafter the positions of the guiding portion 10, the second connecting portion 12, the third connecting portion 13, the fourth connecting portion 14 and the fifth connecting portion 15 are described relative to the first connecting portion 11.

Referring to FIGS. 2A and 2B simultaneously, FIG. 2B is an enlarged view of a region r1 which contains the guiding portion 10 located at the coordinate point (x10, y10) in FIG. 2A. Two guiding portions 10 having the same structure are spaced from each other and located in the first quadrant I, and the arranged direction of the guiding portions 10 is parallel to the coordinate axis Y/−Y, i.e., one of the guiding portions 10 has the same distance as the other with respect to the coordinate axis Y/−Y. An angle θ1 is formed between the slanted surface 100s1 of the guiding portion 10 and the plane XY, and another angle θ2 is formed between the thrust surface 100s2 of the guiding portion 10 and the plane XY. In this embodiment, the angle θ1 is an obtuse angel (greater than 90 degrees), and the angle θ2 is a right angel (equal to 90 degrees).

Referring to FIGS. 2A and 2C simultaneously, FIG. 2C is an enlarged view of a region r2 which contains the second connecting portion 12 located at the coordinate point (x12, y12) in FIG. 2A. The second connecting portion 12 located in the third quadrant III comprises a recess 120r which is constructed by an inner top surface 1200 and two inner sidewall surfaces 1201/1202 perpendicular to the inner top surface 1200, wherein the inner top surface 1200 is parallel to the plane XY, and the inner sidewall surfaces 1201/1202 are substantially perpendicular to each other and respectively parallel to the coordinate axes X/−X and Y/−Y.

Referring to FIGS. 2A and 2D simultaneously, FIG. 2D is an enlarged view of a region r3 which contains the third connecting portion 13 and the fourth connecting portion 14 located at the coordinate points (x13, y13) and (x14, y14) in FIG. 2A, respectively. The third connecting portion 13 located in the fourth quadrant IV comprises a recess 130r which is formed by an inner top surface 1300 and an inner sidewall surface 1301 perpendicular to the inner top surface 1300, wherein the inner top surface 1300 is parallel to the plane XY. The fourth connecting portion 14 is located in the fourth quadrant IV. An angle α is formed between the slanted surface 140s of the fourth connecting portion 14 and the plane XY. The inclining direction of the slanted surface 140s of the fourth connecting portion 14 is the same to that of the slanted surface 100s1 of the guiding portion 10.

As shown in FIG. 2A, the intermediate member 2 comprises a top surface 2001, a bottom surface 2002, a front end portion 2011, a rear end portion 2012, two side end portions 2013/2014, a first engaging portion 21, a second engaging portion 22, a third engaging portion 23 and a fourth engaging portion 24. The first engaging portion 21 and the fourth engaging portion 24 are hole structures (e.g. through holes) penetrating through the top surface 2001 and the bottom surface 2002. The second engaging portion 22 is a cornered structure formed at an intersection of the front end portion 2011 and the side end portion 2014. The third engaging portion 23 is a rectangular part formed at front end portion 2011 and the side end portion 2013 (i.e. on the top surface 2001 closing to the side end portion 2013). The first engaging portion 21, the second engaging portion 22 and the third engaging portion 23 of the intermediate member 2 are engaged to the first connecting portion 11, the second connecting portion 12 and the third connecting portion 13 of the substrate 1, respectively. In this embodiment, the intermediate member 2 is a printed circuit board (PCB), and the lens 4 is disposed on the top surface 2001 of the intermediate member 2.

Figure 3A:
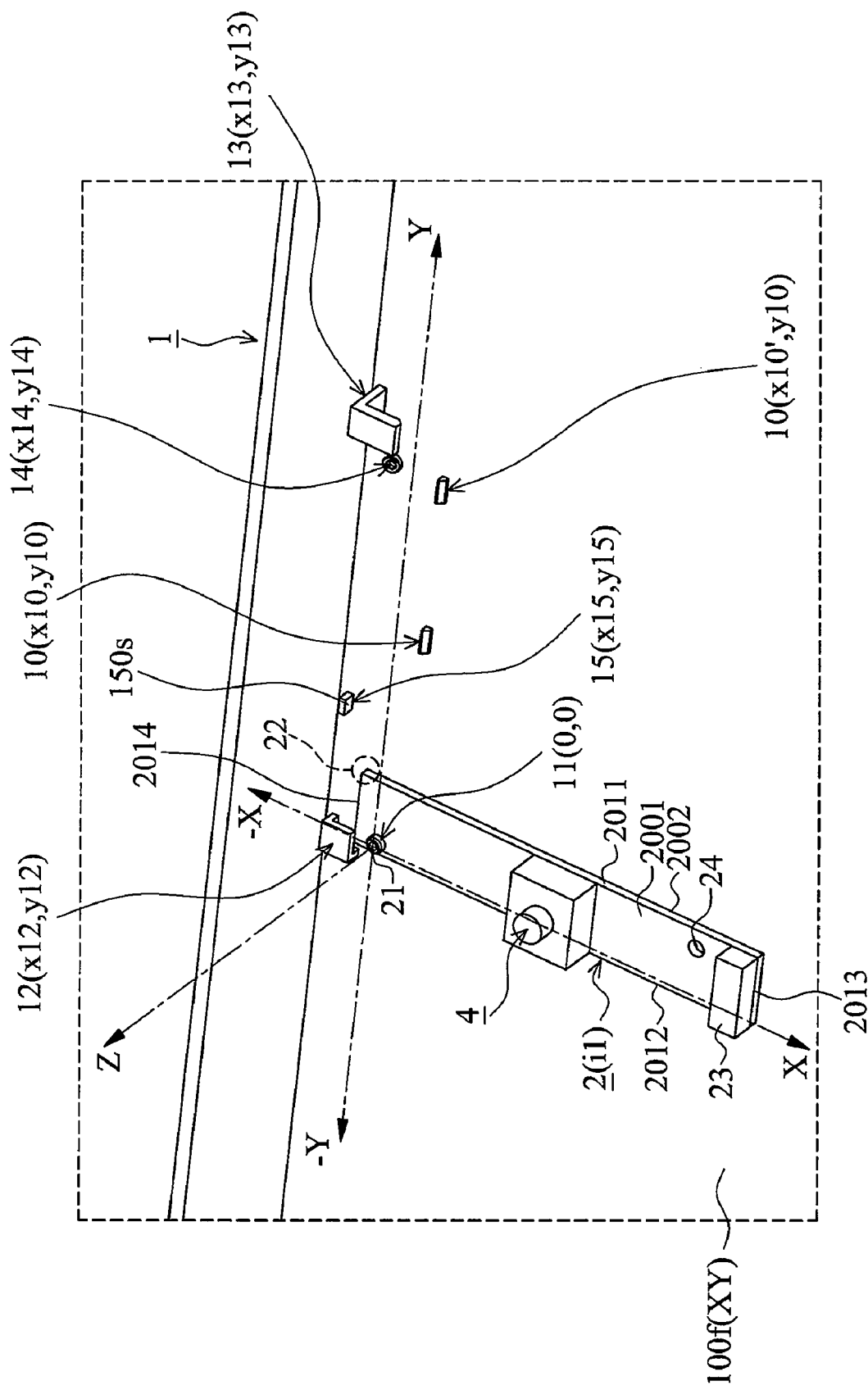
FIG. 3A is a schematic view of installation of a lens via a positioning structure.
Figure 3B:
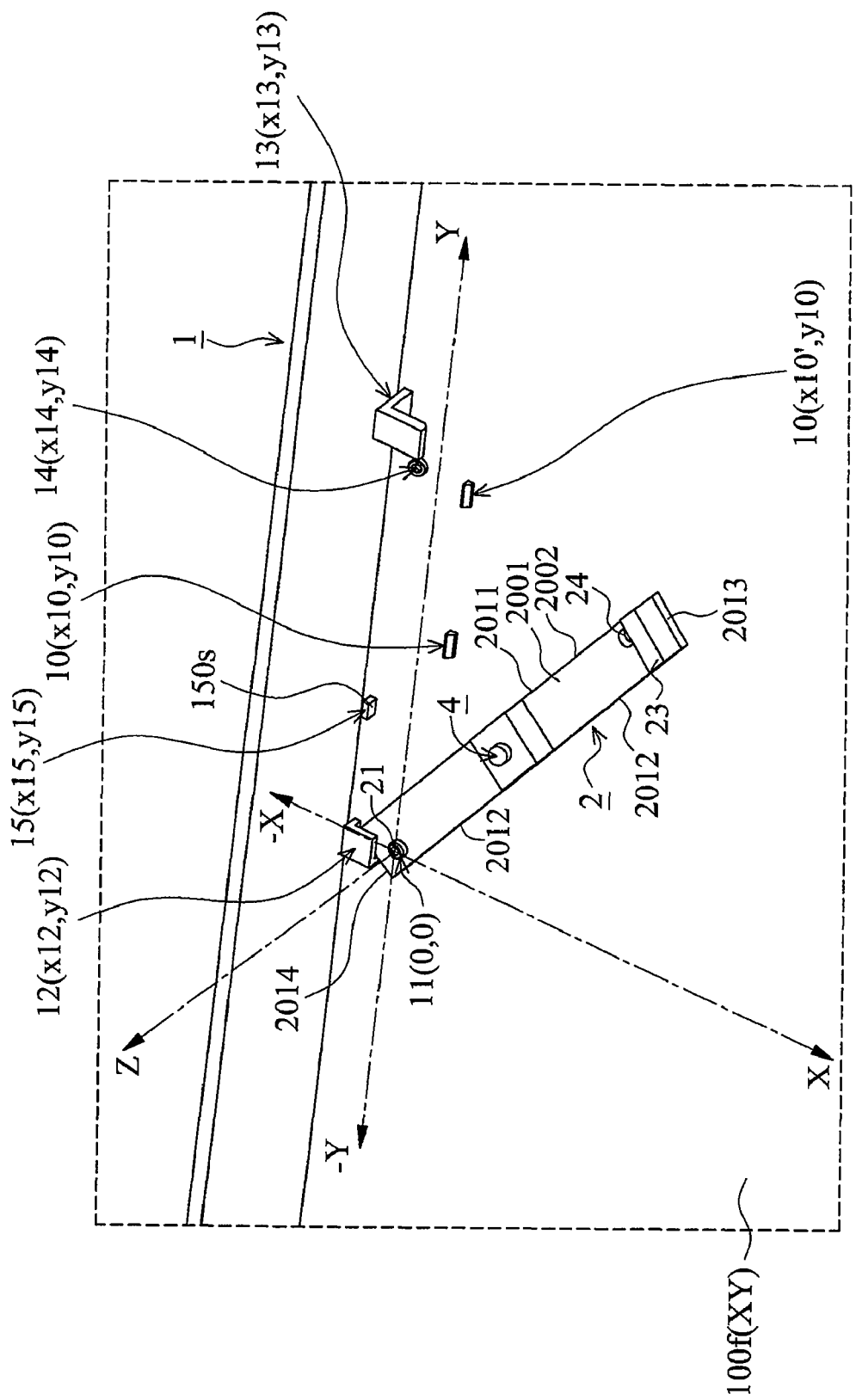
FIG. 3B is a schematic view of installation of the lens via the positioning structure.
Figure 3C:
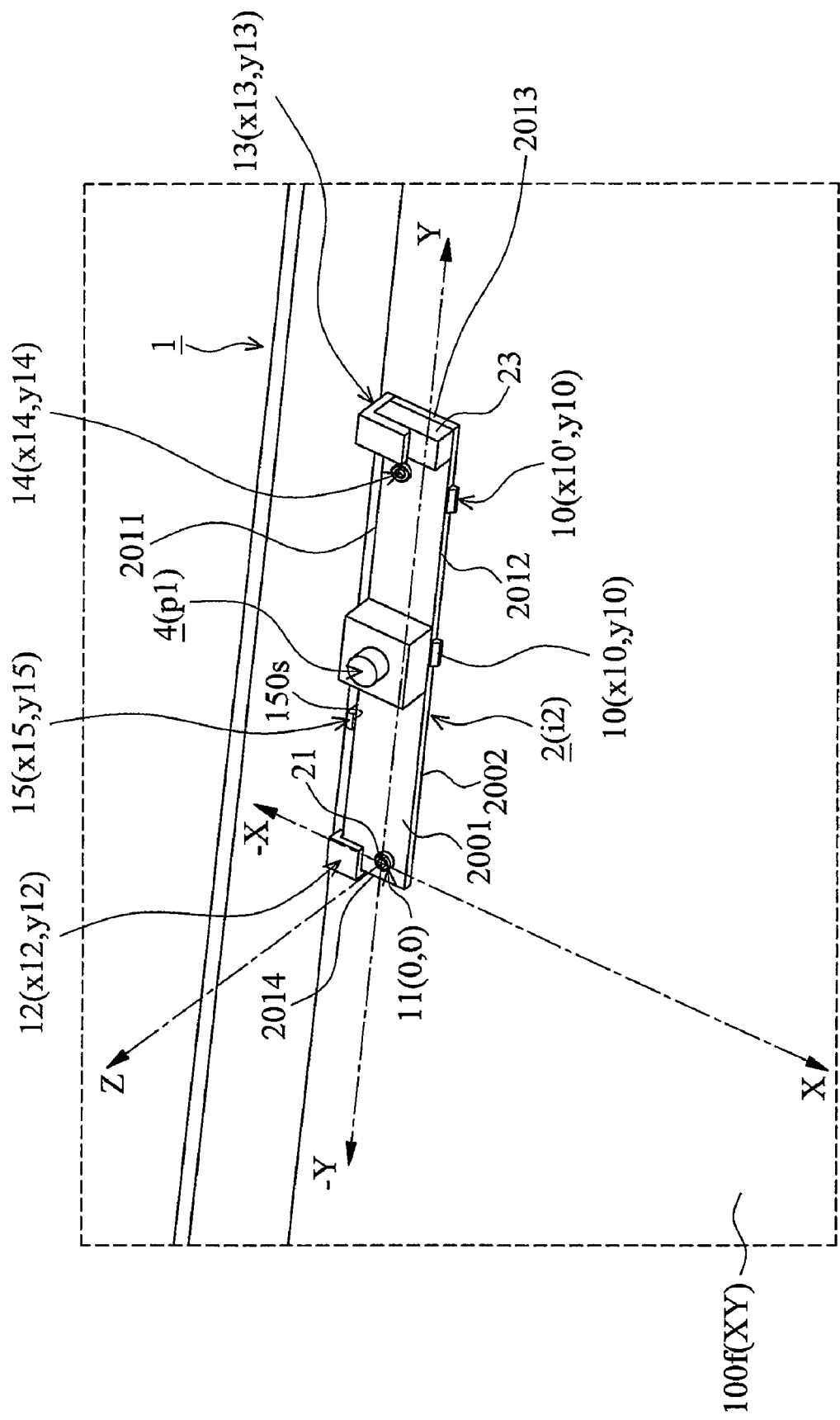
FIG. 3C is a schematic view of installation of the lens via the positioning structure.

Referring to FIGS. 3A and 2A-2D simultaneously, when the first engaging portion 21 of the intermediate member 2 is pivoted to the first connecting portion 11 of the substrate 1 in the direction of the coordinate axis Z, the intermediate member 2 can be movably switched from a first position i1 to a second position i2 (shown in FIG. 3C) with respect to the substrate 1. Because the first engaging portion 21 of the intermediate member 2 can freely move along the first connecting portion 11 of the substrate 1 in the direction of the coordinate axis Z, the intermediate member 2 is provided with two degrees of freedom with respect to the substrate 1, i.e., one rotation (about the coordinate axis Z) and one transverse (along the axial direction of the coordinate axis Z). Note that an angle 90 degrees is substantially formed between the first position i1 and the second position i2.

Referring to FIGS. 3B and 2A-2D simultaneously, when the intermediate member 2 is switched from the first position i1 toward the second position i2, the front end portion 2011 of the intermediate member 2 is contacted by the guiding portions 10, the intermediate member 2 is then uplifted by the guidance of the slanted surfaces 100s1 of the guiding portions 10, and the bottom surface 2002 of the intermediate member 2 simultaneously slides on the guiding portions 10.

Referring to FIGS. 3C and 2A-2D simultaneously, when the bottom surface 2002 of the intermediate member 2 fully passes by the slanted surface 100s1 of the guiding portions 10, the rear end portion 2012 of the intermediate member 2 slides on the thrust surface 100s2 of the guiding portions 10 by the guidance of the thrust surface 100s2 of the guiding portions 10. The fourth engaging portion 24 of the intermediate member 2 is positioned at the fourth connecting portion 14 and the side end portion 2014 of the intermediate member 2 is pressed against the inner sidewall surface 1201 of the second connecting portion 12 simultaneously. The front end portion 2011 of the intermediate member 2 is simultaneously pressed against the inner sidewall surface 1202 of the second connecting portion 12, the thrust surface 150s of the fifth connecting portion 15 and the inner sidewall surface 1301 of the third connecting portion 13. The inner top surface 1200 of the second connecting portion 12 is contact with the top surface 2001 of the intermediate member 2, and the inner top surface 1300 of the third connecting portion 13 is contact with the outer surface of the third engaging portion 23, so that the intermediate member 2 is positioned at the second position i2. The intermediate member 2 positioned at the second position i2 is provided with zero degree of freedom, i.e., without rotation or transverse with respect to the substrate 1. The lens 4 is disposed at the predetermined position p1 via the intermediate member 2 positioned at the second position i2, and the lens 4 disposed at the predetermined position p1 is fixed without sliding.

By the positioning structure K of the embodiment, the lens 4 is not interfered with other structures and electronic components (not shown) located on the substrate 1.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A positioning structure, comprising:
   a first body comprising a guiding portion, a first connecting portion, a second connecting portion and a third connecting portion; and
   a second body movably switched from a first position to a second position with respect to the first body, comprising a first engaging portion, a second engaging portion and a third engaging portion, wherein the first engaging portion, the second engaging portion and the third engaging portion are engaged to the first connecting portion, the second connecting portion and the third connecting portion of the first body, respectively;
   when the first engaging portion of the second body located at the first position is engaged to the first connecting portion of the first body, the second body is provided with at least two degrees of freedom with respect to the first body, and when the first engaging portion of the second body, movably switched from the first position toward the second position and guided by the guiding portion of the first body, is positioned at the second position, the second connecting portion and the third connecting portion of the first body are positioned at the second engaging portion and the third engaging portion of the second body, respectively, and the second body is provided with zero degree of freedom with respect to the first body.

2. The positioning structure as claimed in claim 1, wherein the first engaging portion of the second body is pivoted to the first connecting portion of the first body.

3. The positioning structure as claimed in claim 1, wherein the guiding portion of the first body comprises a slanted surface, and the second body is contacted by the slanted surface of the guiding portion of the first body when the second body is movably switched from the first position toward the second position.

4. The positioning structure as claimed in claim 3, wherein the guiding portion of the first body further comprises a thrust surface, and the second body is contacted by the thrust surface of the guiding portion of the first body when the second body is moved to the second position.

5. The positioning structure as claimed in claim 1, wherein the first connecting portion of the first body comprises a cylindrical structure, and the first engaging portion of the second body comprises a hole structure.

6. The positioning structure as claimed in claim 1, wherein the second connecting portion of the first body comprises a recessed L-shaped structure, and the second engaging portion of the second body comprises a corner structure.

7. The positioning structure as claimed in claim 1, wherein the third connecting portion of the first body comprises a similar L-shaped structure, and the third engaging portion of the second body comprises a corner structure.

8. The positioning structure as claimed in claim 1, wherein the second body comprises a circuit board.

9. An electronic device, comprising:
   a substrate comprising a guiding portion, a first connecting portion, a second connecting portion and a third connecting portion;
   an intermediate member movably switched from a first position to a second position with respect to the substrate, comprising a first engaging portion, a second engaging portion and a third engaging portion, wherein the first engaging portion, the second engaging portion and the third engaging portion are engaged to the first connecting portion, the second connecting portion and the third connecting portion of the substrate, respectively; and
   a lens disposed at a predetermined position via the intermediate member with respect to the substrate;
   when the first engaging portion of the intermediate member located at the first position is engaged to the first connecting portion of the substrate, the intermediate member is provided with at least two degrees of freedom with respect to the substrate, and when the first engaging portion of the intermediate member, movably switched from the first position toward the second position and guided by the guiding portion of the substrate, is positioned at the second position, the second connecting portion and the third connecting portion of the substrate are positioned at the second engaging portion and the third engaging portion of the intermediate member, respectively, and the intermediate member is provided with zero degree of freedom with respect to the substrate, and the lens is disposed at the predetermined position via the intermediate member.

10. The electronic device as claimed in claim 9, wherein the first engaging portion of the intermediate member is pivoted to the first connecting portion of the substrate.

11. The electronic device as claimed in claim 9, wherein the guiding portion of the substrate comprises a slanted surface, and the intermediate member is contacted by the slanted surface of the guiding portion of the substrate when the intermediate member is movably switched from the first position toward the second position.

12. The electronic device as claimed in claim 11, wherein the guiding portion of the substrate further comprises a thrust surface, and the intermediate member is contacted by the thrust surface of the guiding portion of the substrate when the intermediate member is moved to the second position.

13. The electronic device as claimed in claim 9, wherein the first connecting portion of the substrate comprises a cylindrical structure, and the first engaging portion of the intermediate member comprises a hole structure.

14. The electronic device as claimed in claim 13, wherein the second connecting portion of the substrate comprises a recessed L-shaped structure, and the second engaging portion of the intermediate member comprises a corner structure.

15. The electronic device as claimed in claim 14, wherein the intermediate member comprises a circuit board.

16. The electronic device as claimed in claim 15, wherein the electronic device comprises a display.

17. The electronic device as claimed in claim 9, wherein the second connecting portion of the substrate comprises a recessed L-shaped structure, and the second engaging portion of the intermediate member comprises a corner structure.

18. The electronic device as claimed in claim 9, wherein the third connecting portion of the substrate comprises a similar L-shaped structure, and the third engaging portion of the intermediate member comprises a corner structure.

19. The electronic device as claimed in claim 9, wherein the intermediate member comprises a circuit board.

20. The electronic device as claimed in claim 9, wherein the electronic device comprises a display.

* * * * *